United States Patent
Kyle et al.

(10) Patent No.: US 7,361,116 B2
(45) Date of Patent: Apr. 22, 2008

(54) MECHANICAL LOCKING DIFFERENTIAL LOCKOUT MECHANISM

(75) Inventors: Robert J. Kyle, Battle Creek, MI (US); Keith E. Morgensai, Marshall, MI (US); Thomas L. Sape, Bloomfield Hills, MI (US); Gregory L. Heatwole, Ft. Wayne, IN (US)

(73) Assignee: Eaton Corporation, Cleveland, OH (US)

( * ) Notice: Subject to any disclaimer, the term of this patent is extended or adjusted under 35 U.S.C. 154(b) by 243 days.

(21) Appl. No.: 11/354,627

(22) Filed: Feb. 15, 2006

(65) Prior Publication Data

US 2007/0191173 A1    Aug. 16, 2007

(51) Int. Cl.
*F16H 48/06* (2006.01)
(52) U.S. Cl. .................................... 475/232
(58) Field of Classification Search ........... 475/231, 475/232
See application file for complete search history.

(56) References Cited

U.S. PATENT DOCUMENTS

| | | | |
|---|---|---|---|
| 3,606,803 | A | 9/1971 | Ottemann |
| RE28,004 | E | 5/1974 | Ottemann |
| 3,831,462 | A | 8/1974 | Baremor |
| 4,838,118 | A | 6/1989 | Binkley |

*Primary Examiner*—Dirk Wright
(74) *Attorney, Agent, or Firm*—Anna M. Shih; Bradley J. Diedrich

(57) ABSTRACT

An improved differential gear mechanism is characterized by a lockout mechanism (63) operably associated with a flyweight mechanism (53) and including a lockout member (65, 101) positionable, in response to an input signal, in a normal condition and a lockout condition. In the normal condition, the lockout member (65, 101) permits a flyweight stop surface (57) to move from the retracted position to the extended position. In the lockout condition, the lockout member (65, 101) prevents the flyweight stop surface (57) from moving from the retracted position to the extended position.

16 Claims, 9 Drawing Sheets

MECHANICAL LOCKING DIFFERENTIAL LOCKOUT MECHANISM

BACKGROUND OF THE DISCLOSURE

The present invention relates to differential gear mechanisms, and more particularly, to such mechanisms of the type commonly referred to as "locking differentials". More specifically, the present invention relates to mechanisms of the type also referred to as "mechanical lockers", i.e., locking differentials in which the locking function occurs in response to the operation of a mechanical device, as opposed to hydraulic actuation or electromagnetic actuation.

A conventional locking differential made by the assignee of the present invention utilizes a flyweight mechanism to initiate the lock-up of the differential clutch, wherein the flyweight mechanism then retards rotation of the cam plate relative to the differential input (i.e., the ring gear and differential case). Locking differentials of the type that utilize a flyweight mechanism to initiate clutch engagement are now well known, and may be made in accordance with the teachings of any one or more of U.S. Pat. Nos. 3,606,803; 5,484,347, and 6,319,166, all of which are assigned to the assignee of the present invention and incorporated herein by reference. However, it should be understood that the present invention is not limited to only locking differentials that are made in accordance with the teachings of the cited patents.

The locking differentials of the type made and sold commercially by the assignee of the present invention have been in widespread commercial usage for many years, and have performed in an extremely satisfactory manner, especially on vehicles which operate, for at least part of their duty cycle, on rough, uneven terrain, or under conditions of poor traction. Such locking differentials perform especially well when the vehicle is operating on what is referred to as a "split-$\mu$" surface, i.e., wherein the drive wheel on one side of the vehicle has fairly good traction, and the drive wheel on the other side of the vehicle has very poor traction. In such operating conditions, the locking differential will engage the locking clutch, thus driving both drive wheels at the input speed to the differential case (i.e., the speed of rotation of the input ring gear).

One situation that has been observed, in which the conventional locking differential does not perform in a satisfactory manner, is when a vehicle equipped with a mechanical locking differential is operating in a condition in which "spin-out" of one of the driving wheels is inherent. For example, if the vehicle is operating with a mini-spare (i.e., a spare tire which, for purposes of saving space in the trunk, is substantially smaller than the "normal" tires), the difference in tire diameter will cause operation of the differential flyweight mechanism, and lock-up of the differential clutch pack, even as the vehicle is operating in a "straight-ahead" mode.

BRIEF SUMMARY OF THE INVENTION

Accordingly, it is an object of the present invention to provide an improved differential gear mechanism, of the "mechanical locker" type, in which it is possible to, in some manner, control operation of the mechanical device that normally initiates engagement of the differential clutch, wherein such control is not dependent on only the normal mode of operation of the mechanical device.

It is a more specific object of the present invention to provide such an improved differential gear mechanism in which it is possible to "lock-out" or to prevent the operation of, a flyweight mechanism which reacts to the speed difference between the two differential side gears and initiates engagement of the differential clutch.

The above and other objects of the invention are accomplished by the provision of an improved differential gear mechanism comprising a gear case defining a gear chamber, a differential gear set disposed in the gear chamber, and including at least one input gear and a pair of output gears defining an axis of rotation. A lock-up clutch is operable to retard differentiating action, and included is an actuating means for actuating the lock-up clutch. The lock-up clutch is operable between an engaged condition, effective to retard relative rotation between the gear case and the output gears, and a disengaged condition. The actuating means includes cam means operable to affect the engaged condition of the lock-up clutch, and retarding means operable to engage the cam means and retard rotation of one member of the cam means. The retarding means comprises a flyweight mechanism rotatable about an axis oriented generally parallel to the axis of rotation of the differential gear mechanism, the flyweight mechanism being rotatable at a speed generally representative of the extent of the differentiating action and defining a stop surface moveable from a retracted position to an extended position in response to a predetermined extent of differentiating action. The actuating means further includes a latch surface disposed to engage the stop surface when the stop surface is in the extended position.

The improved differential gear mechanism is characterized by a lockout mechanism operably associated with the flyweight mechanism and including a lockout member positionable, in response to an input signal, between a normal condition and a lockout condition. In the normal condition, the lockout member permits the stop surface to move from the retracted position to the extended position. In the lockout condition, the lockout member prevents the stop member from moving from the retracted position to the extended position.

DETAILED DESCRIPTION OF THE PREFERRED EMBODIMENT

Figure 1:
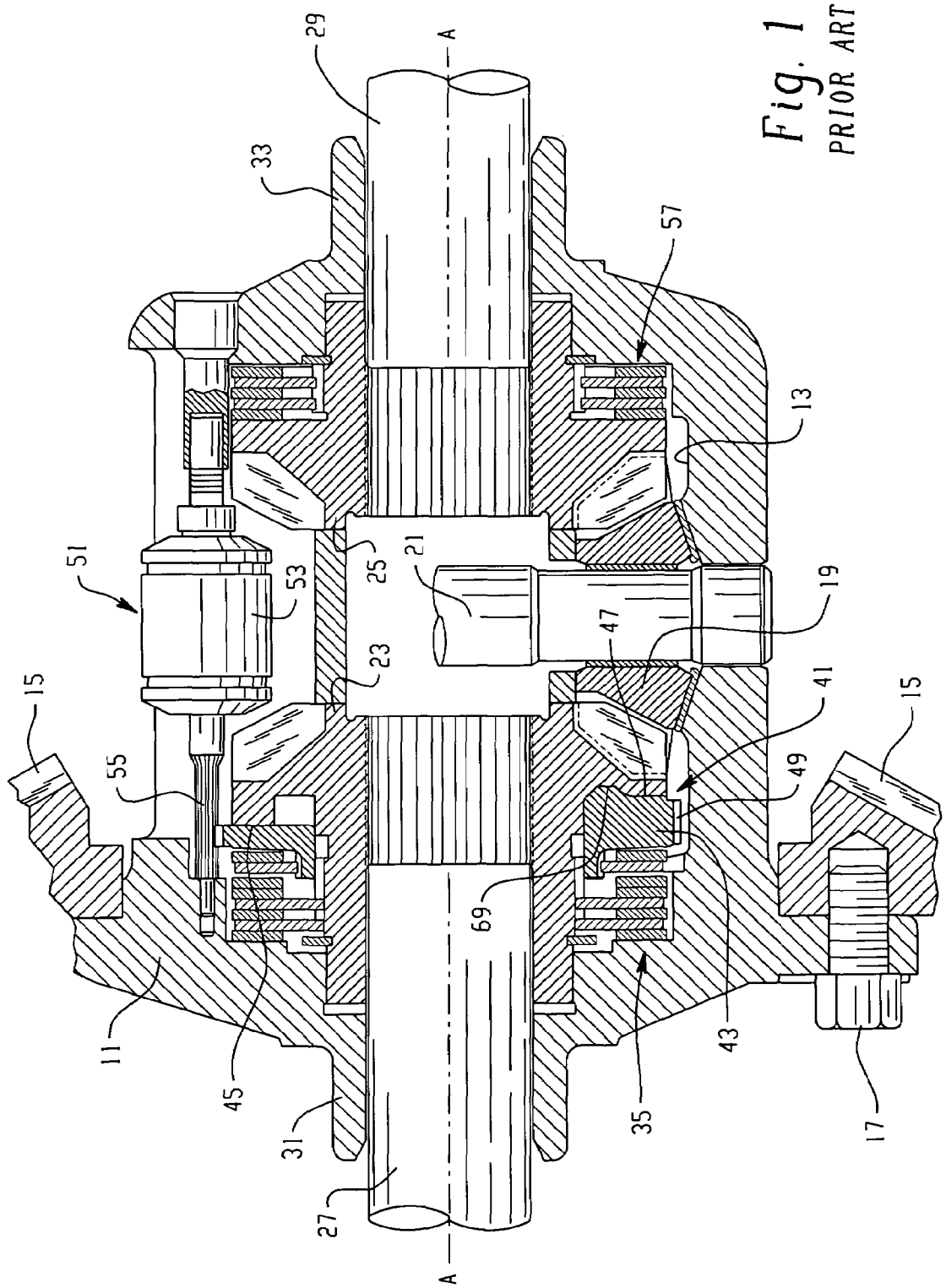
FIG. 1 is an axial cross-section of a locking differential mechanism ("Prior Art") of the type with which the present invention may be utilized.

Referring now to the drawings, which are not intended to limit the invention, FIG. 1 is an axial cross-section of a locking differential gear mechanism of the type that may advantageously utilize the present invention. The overall construction and operation of the locking differential shown in FIG. 1 is already well known to those skilled in the art, and is illustrated and described in greater detail in the above-incorporated patents. The differential gear mechanism as shown in FIG. 1 ("Prior Art") includes a gear case 11 that defines therein a gear chamber, generally designated 13. Torque input to the locking differential is typically by means of an input gear 15 (shown only in fragmentary view in FIG. 1). The input gear 15 (also referred to as a "ring gear") is intended to be in toothed engagement with an input pinion gear (not shown in FIG. 1), which receives input drive torque from the vehicle driveline. The input gear 15 may be attached to the gear case 11 by means of a plurality of bolts 17.

Disposed within the gear chamber 13 is a differential gear set including a plurality of pinion gears 19 (only one of which is shown in FIG. 1), rotatably mounted on a pinion shaft 21 (only a portion of which is shown in FIG. 1). The pinion shaft 21 is secured to the gear case 11 by any suitable means, not shown herein. The pinion gears comprise the input gears of the differential gear set, and are in meshing engagement with a pair of side gears 23 and 25, which comprise the output gears of the differential gear set. The side gears 23 and 25 are in splined engagement with a pair of axle shafts 27 and 29, respectively. The gear case 11 includes annular hub portions 31 and 33, surrounding the axle shafts 27 and 29, respectively. Typically, bearing sets (not shown) are mounted on the hub portions 31 and 33 to provide rotational support for the differential gear mechanism, relative to the main, outer differential housing (also not shown herein).

During normal, straight-ahead operation of the vehicle, no differentiating action occurs between the left and right axle shafts 27 and 29, and the pinion gears 19 do not rotate relative to the pinion shaft 21. Therefore, the gear case 11, the pinion gears 19, the side gears 23 and 25, and the axle shafts 27 and 29 all rotate about an axis of rotation (A) of the axle shafts 27 and 29, as a solid unit.

Under certain operating conditions, such as when the vehicle is turning, or there is a slight difference in the size of the tires associated with the axle shafts 27 and 29, it is permissible for a certain amount of differentiating action to occur between the side gears 23 and 25, up to a predetermined level of speed difference. Above that predetermined level (e.g., above a difference of about 100 rpm between the side gears 23 and 25), indicating that a wheel spin-out is imminent, it is desirable to retard the relative rotation between each of the side gears 23 and 25 and the gear case 11, to prevent excessive differentiating action between the axle shafts 27 and 29.

In order to retard differentiating action, the differential gear means is provided with a lockup means for locking up the differential gear set, and an actuating means for actuating the lockup means. The general construction and operation of the lockup means and the actuating means are now well known in the art, and will be described only briefly herein. For a more detailed explanation of the lockup means and the actuating means, reference should be made to the above-incorporated patents, and further, to U.S. Pat. No. RE 28,004 and U.S. Pat. No. 3,831,462, both of which are assigned to the assignee of the present invention.

In the subject embodiment, the lockup means comprises a clutch pack, generally designated 35. As is now well known to those skilled in the art, the clutch pack 35 includes a plurality of outer clutch disks splined to the gear case 11, and a plurality of inner clutch disks splined to the side gear 23. Referring still to FIG. 1, the lock-up means further includes a cam mechanism, generally designated 41. As is well known to those skilled in the locking differential art, the primary function of the cam mechanism 41 is to effect movement of the clutch pack 35 from the disengaged condition, as shown in FIG. 1, to an engaged, "loaded" condition (not specifically illustrated herein). In the engaged condition, the clutch pack 35 is effective to retard relative rotation between the gear case 11 and the side gear 23, thus retarding and minimizing differentiating action between the side gears 23 and 25.

The cam mechanism 41 includes the side gear 23 and a main cam member 43. The side gear 23 defines a cam surface 45, and the cam member 43 defines a cam surface 47. The cam member 43 also defines a set of external teeth 49, the function of which will be described subsequently. During normal, straight-ahead operation of the vehicle, with little or no differentiating action occurring, the cam surfaces 45 and 47 remain in the neutral position shown in FIG. 1, with the cam member 43 rotating with the side gear 23, at the same rotational speed. Movement of the clutch pack 35 to the engaged condition is accomplished by retarding rotation of the cam member 43, relative to the side gear 23, to cause "ramping" of the cam surfaces 45 and 47, as is well known to those skilled in the cam art. Such ramping results in axial movement of the cam member 43, to the left in FIG. 1, thus initiating engagement of the clutch pack 35.

In order to retard rotation of the cam member 43 relative to the side gear 23, the locking differential gear mechanism includes a retarding mechanism, generally designated 51, which comprises the actuating means for actuating the lockup means. It should become apparent to those skilled in the art that within the scope of the present invention, many different configurations and types of retarding mechanisms may be utilized. In the subject embodiment, and by way of example only, the retarding mechanism 51 is of the flyweight type, illustrated and described in greater detail in the above-incorporated patents and herein below. The retarding mechanism 51 is mounted within the gear case 11 for rotation about its own axis, and includes a cylindrical flyweight portion 53. The retarding mechanism 51 further includes an externally geared portion 55, which is in engagement with the external gear teeth 49 of the cam member 43.

Figure 2:
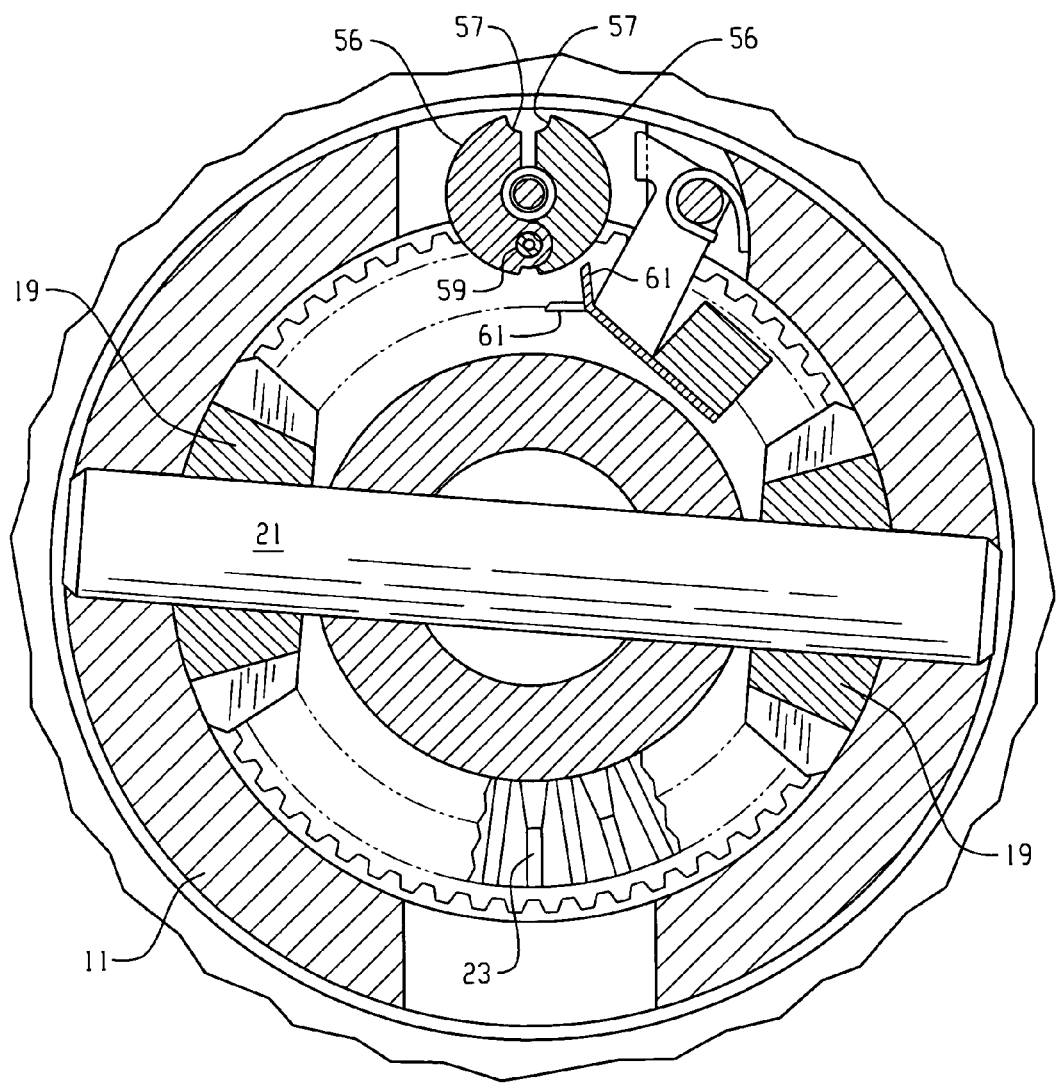
FIG. 2 is a somewhat fragmentary, transverse cross-section of the locking differential mechanism shown in FIG. 1, and on approximately the same scale.
Figure 3:
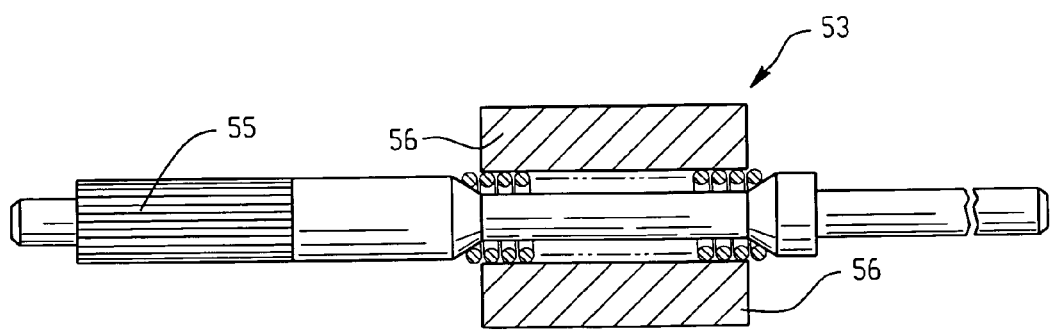
FIG. 3 is an axial cross-section, similar to FIG. 1, but on a larger scale, illustrating in somewhat greater detail the flyweight mechanism which comprises an important part of the locking differential mechanism of FIG. 1.
Figure 4:
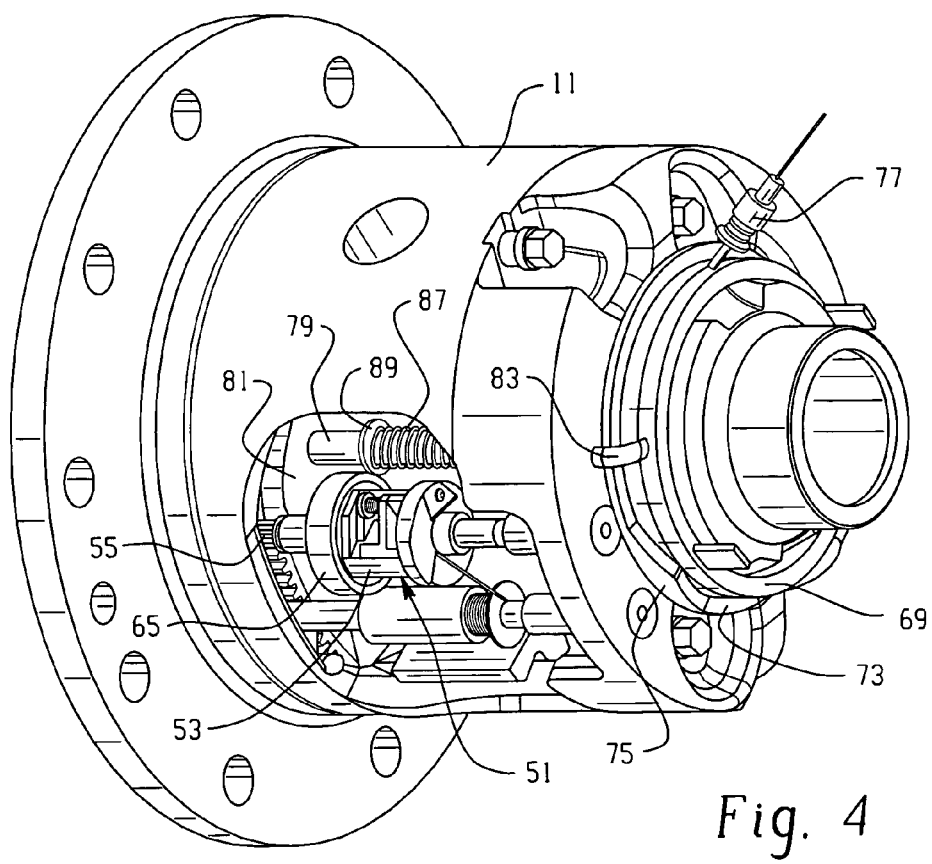
FIG. 4 is a perspective view of a locking differential mechanism according to an embodiment of the present invention.
Figure 5:
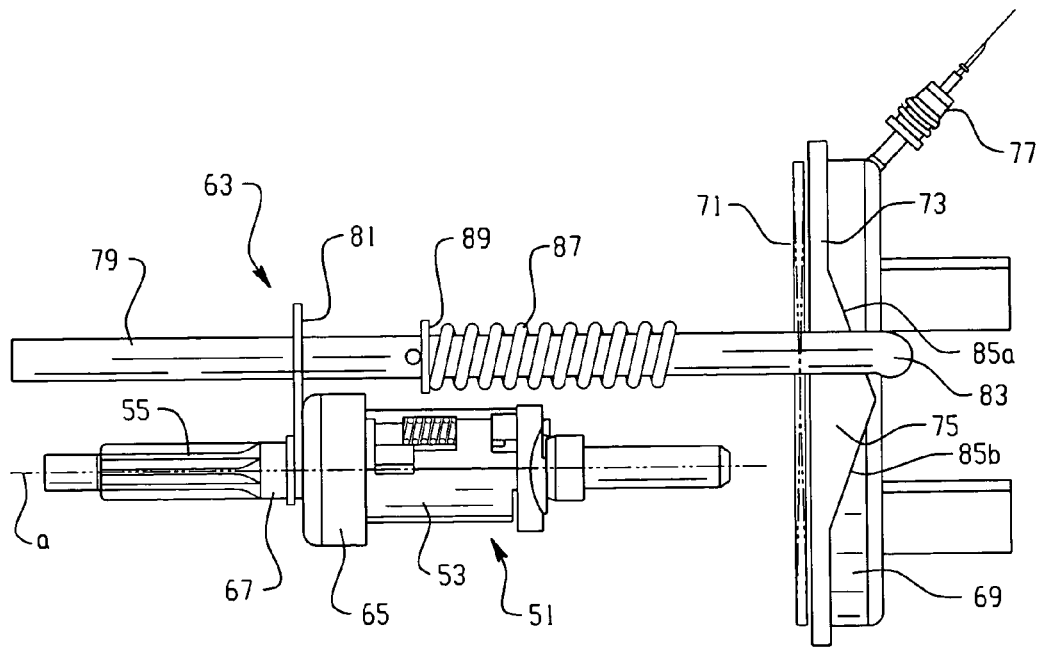
FIG. 5 is a detail view of the flyweight mechanism and a lockout mechanism, which comprise an important part of the locking differential mechanism of FIG. 4.
Figure 6:
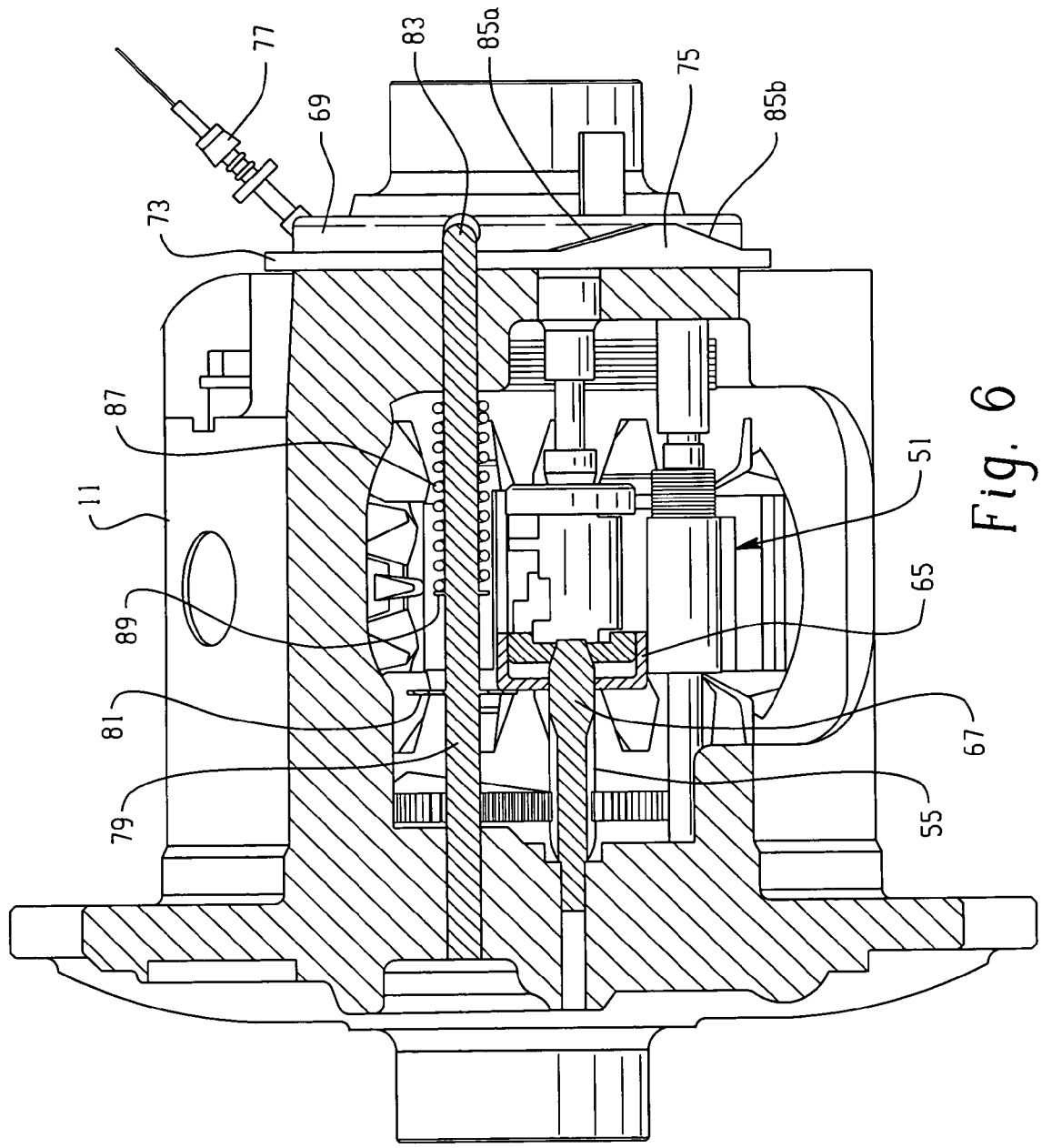
FIG. 6 is a partial cross-sectional view of the locking differential mechanism of FIG. 4, showing a lockout member in a normal condition.

Flyweight portion 53 is rotatable about an axis (a), shown in FIG. 5, and oriented generally parallel to the axis of rotation (A), at a speed generally representative of the extent of the differentiating action. Flyweight portion 53 includes a pair of flyweight members 56 each defining a stop surface 57. The stop surface 57 is moveable from a retracted position (FIG. 2) to an extended position (not shown) in response to a predetermined extent of differentiating action. The flyweight member also defines a pivot portion 59 defining a pivot axis generally parallel to and spaced apart from the axis (a) of the flyweight portion 53. The stop surface 57 is generally oppositely disposed from the pivot axis. The actuating means includes a latch surface 61 positioned to engage the stop surface 57 when the stop surface is in the extended position.

During operation, if differentiating action begins to occur between the axle shafts 27 and 29, the sidegear 23 and cam member 43 will begin to rotate in unison at a speed different than that of the gear case 11, causing the retarding mechanism 51 to begin to rotate about its axis (a) at a rotational speed which is a function of the extent of the differentiating action. As the speed of rotation of the retarding mechanism 51 increases, centrifugal force causes the flyweights 56 to move outward until one of the flyweights stop surface 57 engages the latch surface 61, preventing further rotation of the retarding mechanism 51. When the retarding mechanism 51 stops rotating, the engagement of the geared portion 55 and the gear teeth 49 causes the cam member 43 to rotate at the same speed as the gear case 11 (which is different than the speed of rotation of the sidegear 23), resulting in ramping, and initializing of engagement of the clutch pack 35.

Referring to FIGS. 4-7, a differential gear mechanism is shown that is substantially similar to the mechanism shown in FIG. 1 with at least one exception, namely, a lockout mechanism 63 is operably associated with the retarding mechanism 51. The lockout mechanism 63 allows the retarding mechanism 51 to be selectively deactivated when automatic locking of the differential is not desired (e.g., when the vehicle is operating with a mini-spare).

Figure 7:
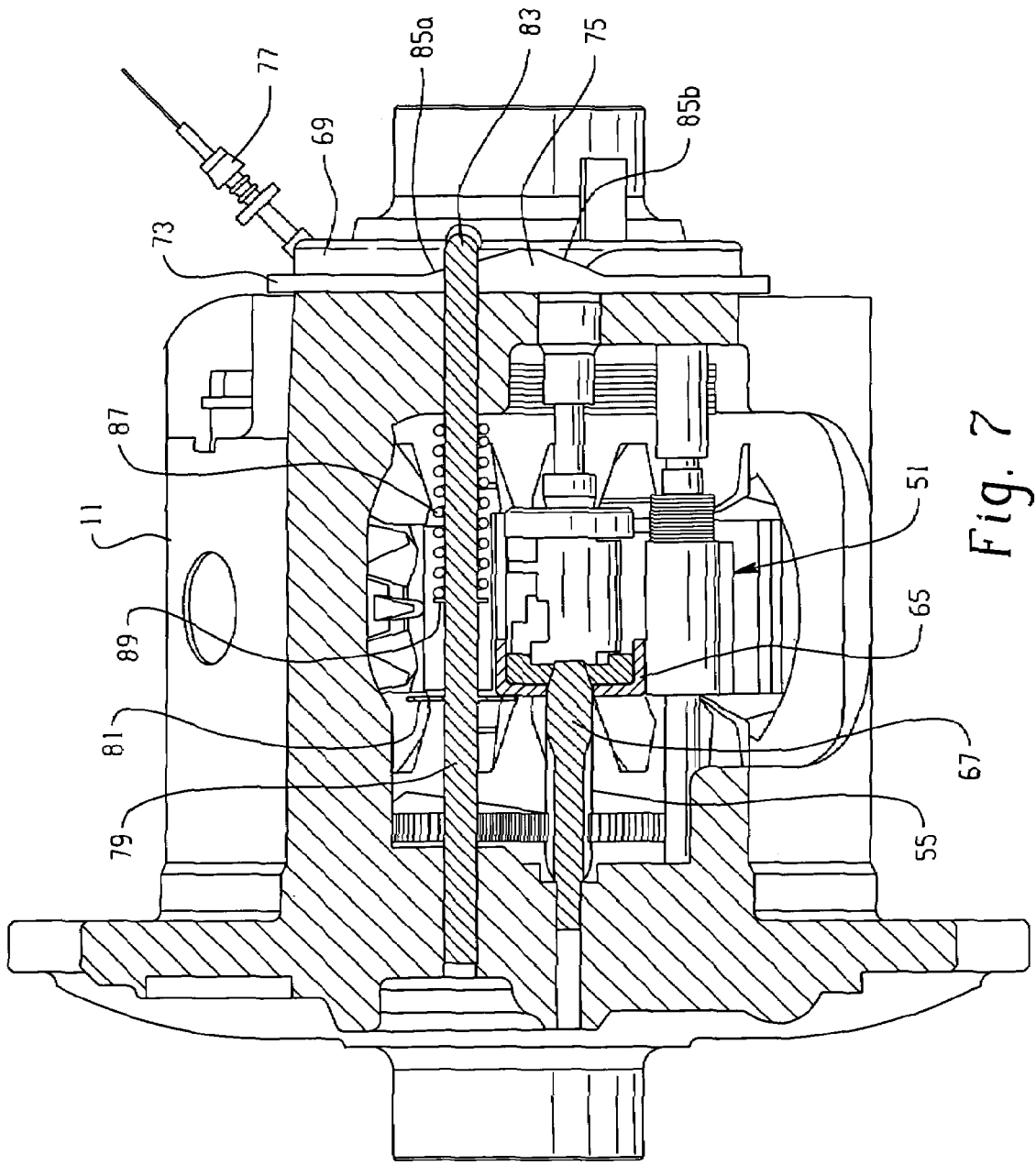
FIG. 7 is a partial cross-sectional view of the locking differential mechanism of FIG. 4, showing a lockout member in a lockout condition.
Figure 8:
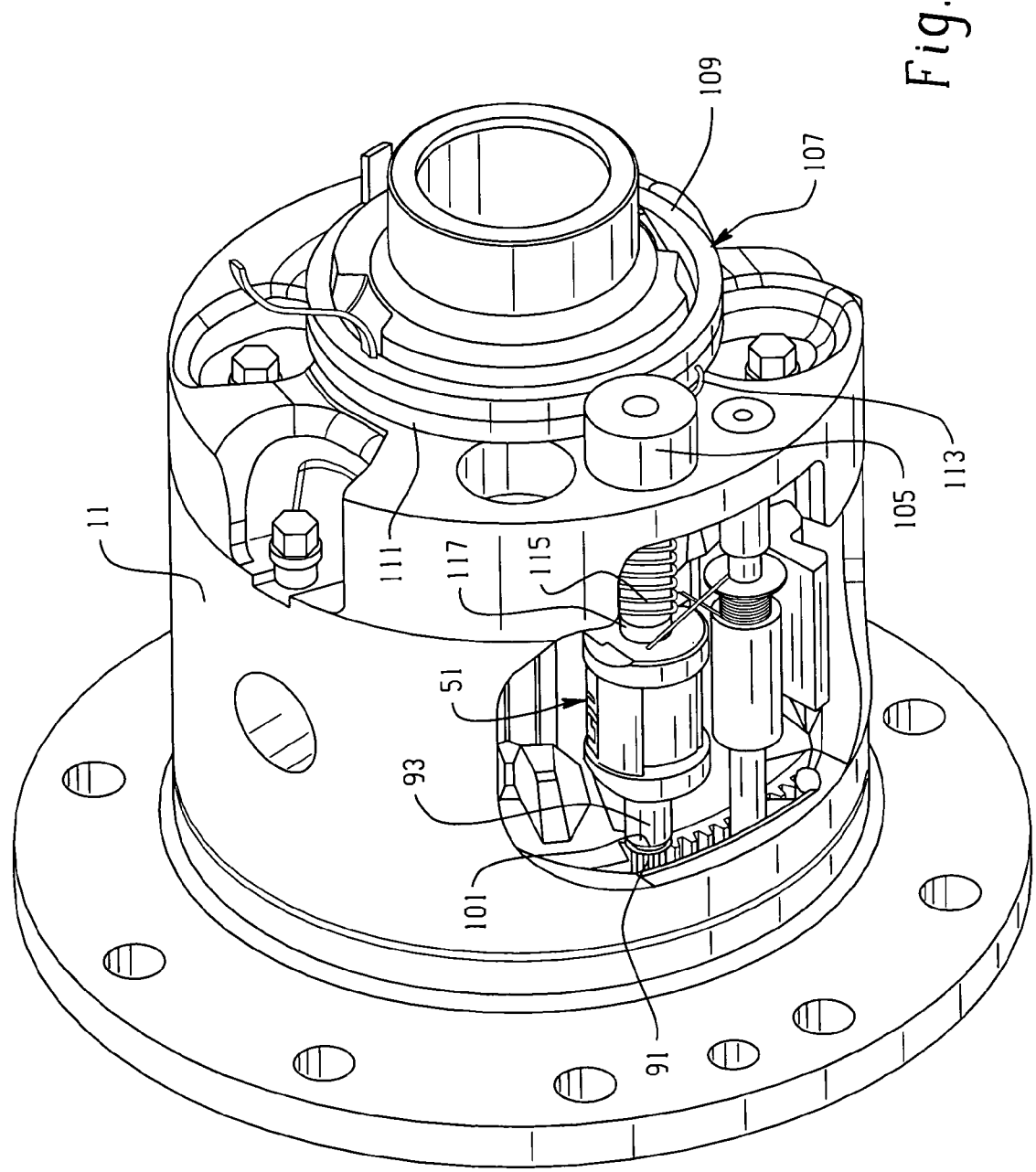
FIG. 8 is a perspective view illustrating a locking differential mechanism according to an alternative embodiment of the present invention.
Figure 9:
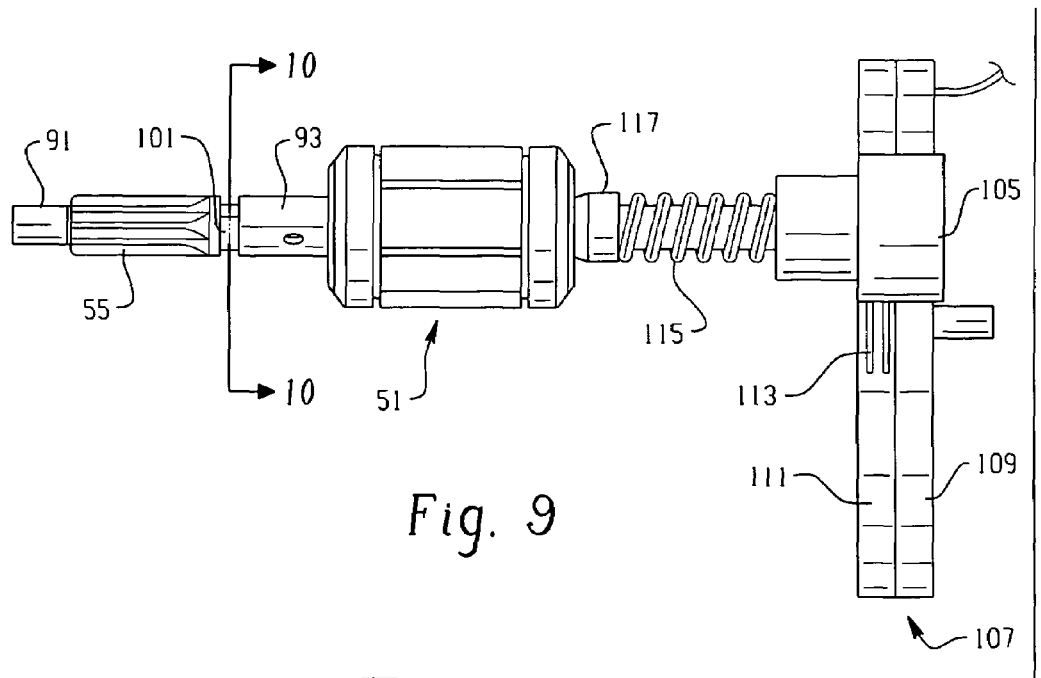
FIG. 9 is a detail view of the flyweight mechanism and a lockout mechanism, which comprise an important part of the locking differential mechanism of FIG. 8.
Figure 10:
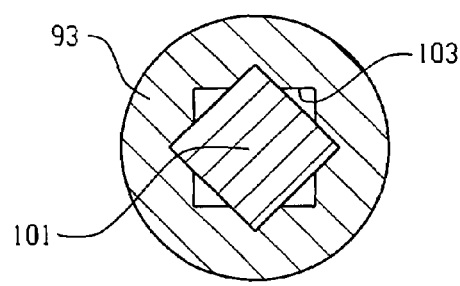
FIG. 10 is a cross-sectional view of a portion of the lockout mechanism shown in FIG. 9.
Figure 11:
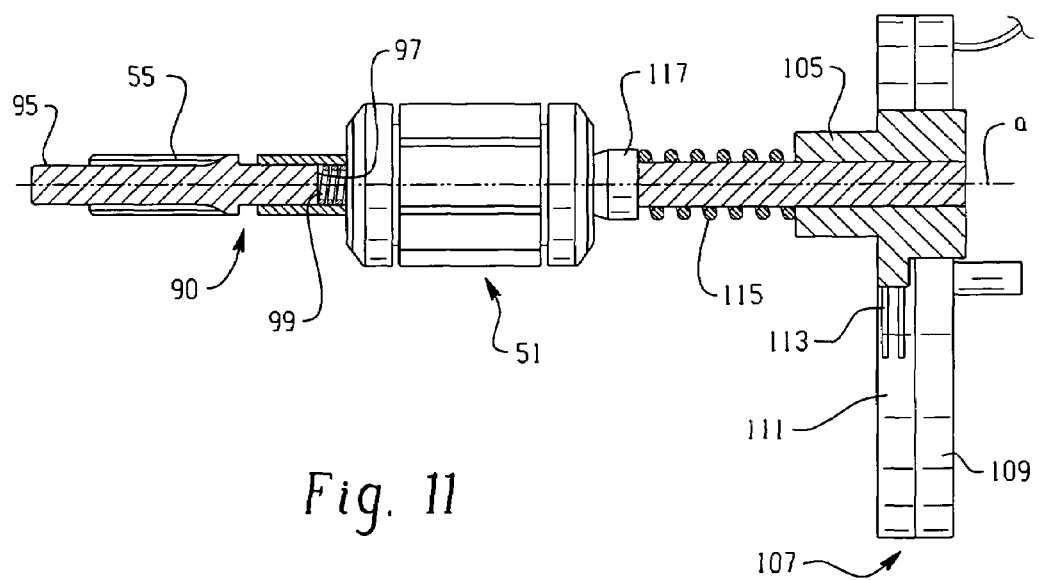
FIG. 11 is a partial cross-sectional view of the flyweight mechanism and the lockout mechanism shown in FIG. 9.
Figure 12:
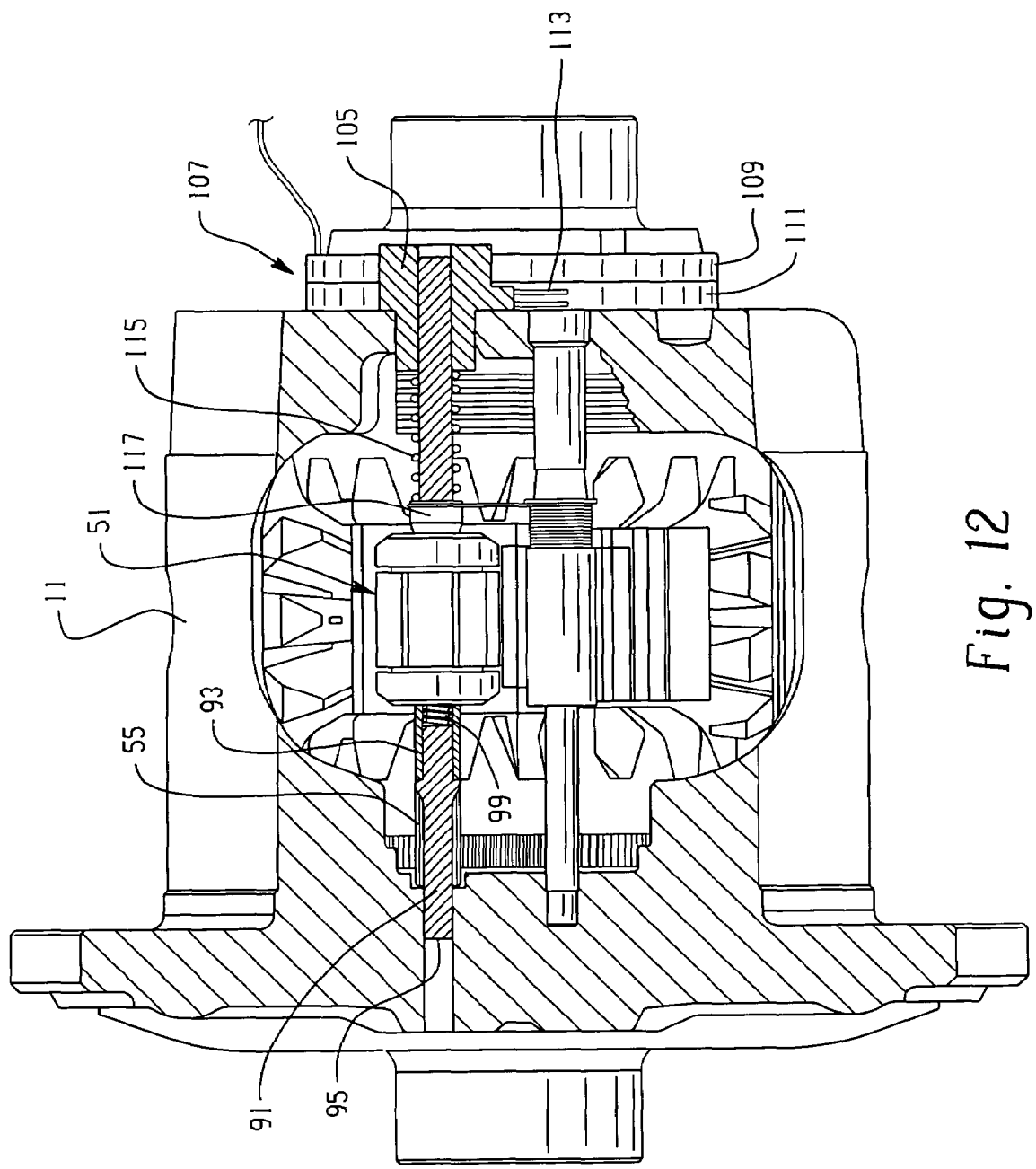
FIG. 12 is a partial cross-sectional view of the locking differential mechanism of FIG. 8, showing a lockout member in a normal condition.
Figure 13:
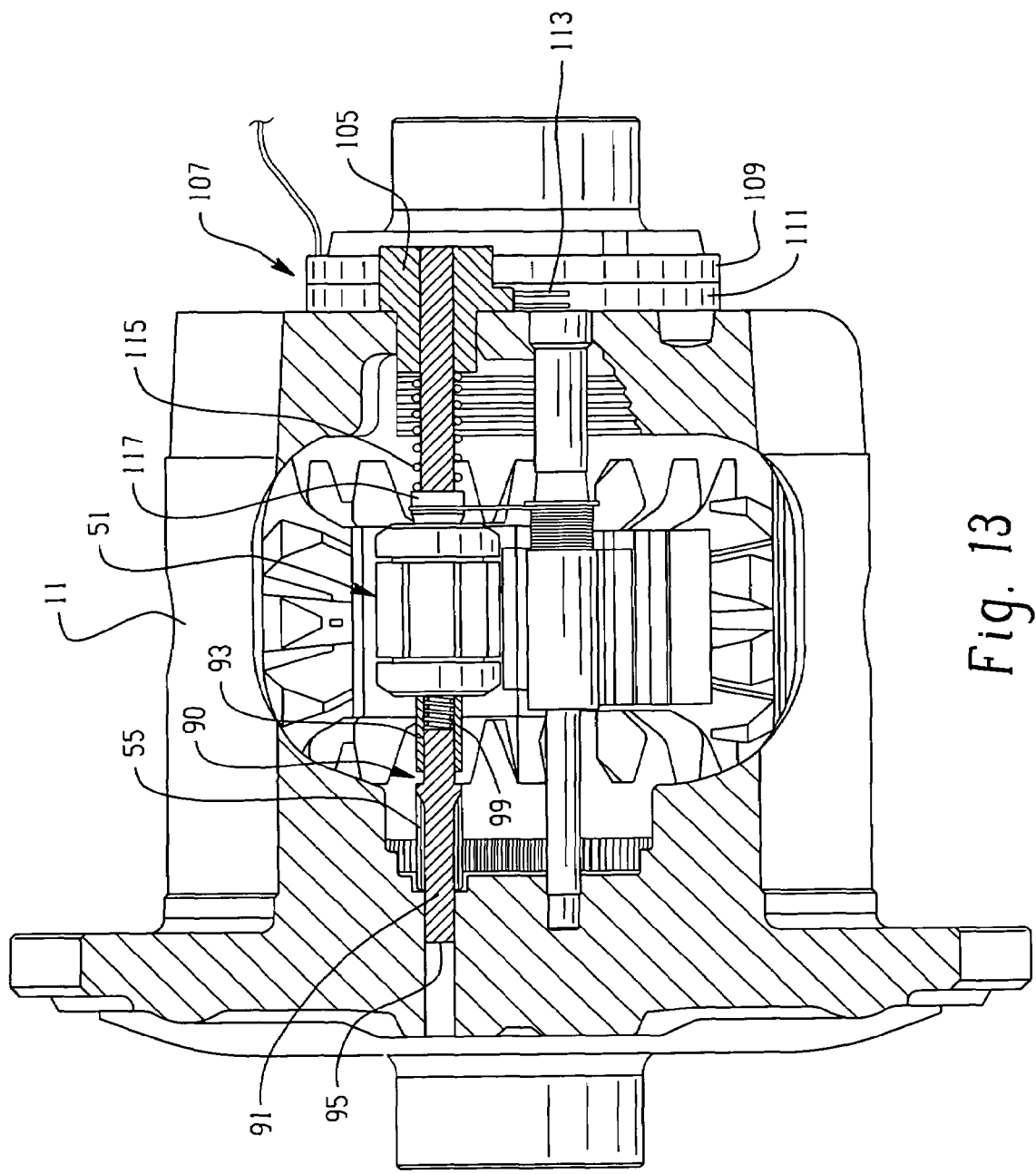
FIG. 13 is a partial cross-sectional view of the locking differential mechanism of FIG. 8, showing a lockout member in a lockout condition.

Lockout mechanism 63 includes a lockout member 65 that is positionable, in response to an input signal, between a normal condition (FIG. 6) and a lockout condition (FIG. 7). In the normal condition, the lockout member 65 permits the stop surface 57 to move from the retracted position to the extended position. In the lockout condition, the lockout member 65 prevents the stop member 57 from moving from the retracted position to the extended position.

In an embodiment illustrated in FIGS. 4-7, the lockout member 65 is generally cylindrical, having a cup-shaped body moveably supported on the retarding mechanism 51 between the externally geared portion 55 and the flyweights 56. In the lockout condition (FIG. 7), the lockout member 65 at least partially surrounds the flyweight mechanism 53 to prevent the flyweight members 56 from pivoting outward as the flyweight mechanism rotates. In the normal condition (FIG. 6), the lockout member 65 is retracted toward the externally geared portion 55 leaving the flyweights 56 free to pivot outward.

The lockout mechanism 63 also comprises a first, generally annular member 69 having an electromagnetic coil 71 that may be energized to produce a magnetic field. A second, generally annular member 73 of known magnetic properties is positioned around the first annular member 69 and includes a ramp 75. First annular member 69 is stationary with respect to the gear case 11, such that the gear case 11 rotates relative to the first annular member 69 during operation. The second annular member 73 is free to rotate with the gear case 11 when the coil 71 is de-energized and is inhibited from rotating with the gear case 11 when the coil 71 is energized by virtue of the second annular member's interaction with the magnetic field generated by the coil. The coil 71 is energized by an electrical input signal, which is selectively transmitted to the coil 71 through an electrical connector 77. The connector is provided in communication with a controller (not shown), such as the vehicle electronic control unit (ECU), which controls communication of the electrical input signal to coil 71.

Referring still to FIGS. 4-7, lockout mechanism 63 also includes a movable, elongated pin 79 connected to the lockout member 65 and adapted to engage the ramp 75 when the coil 71 is energized to move the lockout member 65 toward the lockout condition. The pin 79 is supported by the gear case 11 for movement along an axis generally parallel to axis (a). The pin 79 is laterally offset from retarding mechanism 51 and connected to the lockout member 65 by a connecting member 81. The pin 79 extends through and exits the gear case 11 adjacent the second annular member 73, and includes an end portion 83 orthogonally positioned with respect to a portion of the pin 79 supported within the gear case 11. The end portion 83 engages the ramp 75 when the coil 71 is energized and rotation of the second annular member 73 is inhibited. As the end portion 83 travels up the ramp 75 during engagement, the pin 79 is drawn out of the gear case 11 (to the right in FIG. 5) and the lockout member 65 is moved toward the lockout condition. When the lockout member 65 is in the lockout condition and the pin 79 is fully extended (FIGS. 5 and 7), the second annular member 73 is forced to rotate with the gear case 11 and the pin 79 against the anti-rotative magnetic force created by the coil 71. The ramp 75 includes first and second ramp portions 85a and 85b, either of which are engageable by the end portion 83 of the pin 79 depending on the direction of rotation of the gear case 11.

The pin 79 and the lockout member 65 are urged toward the normal condition by a compression spring 87 positioned between a window surface defined by the gear case 11 and a flange 89 on the pin 79. As the end portion 83 moves away from the gear case 11 due to engagement with the ramp 75, the spring 87 is compressed. When the coil 71 is de-energized and rotation of the second annular member 73 is uninhibited, the spring 87 will force the pin 79 and the lockout member 65 toward the normal condition as the end portion 83 moves down the ramp 75.

Referring now to FIGS. 8-13, another embodiment of the present invention is shown. In the illustrated embodiment, the lockout mechanism 90 comprises a two-piece shaft having a first shaft portion 91 and a second shaft portion 93 upon which flyweight mechanism 53 is supported for rotation therewith. The first and second shaft portions 91, 93 are rotatable about the axis (a) oriented generally parallel to the axis of rotation (A), at a speed generally representative of the extent of the differentiating action. The first shaft portion 91 includes the externally geared portion 55 that meshes with the external teeth 49 of the cam member 43. A first end 95 of first shaft portion 91 is supported by the gear case 11 in the conventional manner and a second end 97 of the first shaft portion 91 is supported by the second shaft portion 93. A first compression spring 99 is disposed between the first and second portions 91, 93 to urge the first shaft portion 91 away from the second shaft portion 93.

The first shaft portion 91 includes a lockout member 101 adapted to be received in a receptacle 103 of the second shaft portion 93. Lockout member 101 comprises a generally polygonal-shaped (when viewed in cross-section) protrusion that mates with the correspondingly-shaped receptacle 103 when properly oriented. In the normal condition, the lockout member 101 is received in the receptacle 103, locking the first and second shaft portions 91, 93 together for common rotation and permitting the stop surface 57 to move from the retracted position to the extended position. In the lockout condition (FIGS. 9-11), the lockout member 101 is not positioned in the receptacle 103, allowing the first shaft portion 91 to freely rotate relative to the second shaft portion 93 and preventing the stop member 57 from moving from the retracted position to the extended position. The lockout member 101 and receptacle 103 configuration illustrated in FIGS. 9-12 is provided by way of example only. It will be appreciated that many different lockout member and receptacle configurations may be employed, including, for example, those configurations where lockout member comprises a different polygonal-shaped protrusion (e.g., hexagon, octagon, etc) or a spline, and those configurations where the lockout member 101 is provided on the second shaft portion for receipt in a receptacle in the first shaft portion.

Referring still to FIGS. 8-13, lockout mechanism 90 also includes an electric solenoid 105 attached to the second shaft portion 93 and supported on the gear case 11 for rotation therewith. The solenoid 105 is selectively operable in response to an electric input signal to move the second shaft portion 93 axially between a position in which the lockout member 101 is in the normal condition (i.e., received in receptacle 103) and a position in which the lockout member 101 is in the lockout condition (i.e., withdrawn from receptacle 103). An electric slip-ring mechanism 107 may be used to transfer the electric input signal from a remote source (e.g., vehicle ECU) to the solenoid 105. The slip-ring mechanism 107 includes a first annular member 109 that is stationary relative to the gear case 11 and a second annular member 111 that is free to rotate with the gear case 11 and the solenoid 105. The second annular member 111 is electrically connected to the solenoid 105 by one or more wires 113, and contacts the first annular member 109 during rotation to permit the electrical input signal to pass from the first annular member 109, through the second annular member 111, and into the solenoid 105.

The second shaft portion 93 is urged toward the first shaft portion 91 by a second compression spring 115 positioned between the solenoid 105 and a flange 117 on the second shaft portion 93. When the solenoid 105 moves the second shaft portion 93 away from the first shaft portion 91, and the lockout member 101 is in the lockout condition, the spring 115 is compressed. When the solenoid is de-energized, the spring 115 will force the second shaft portion 93 toward the first shaft portion 91, returning the lockout member 101 to the normal condition. The spring force generated by the second compression spring 115 is greater than the spring force generated by the first compression spring 99 to permit return to the normal condition.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A differential gear mechanism comprising a gear case defining a gear chamber, a differential gear set disposed in said gear chamber, and including at least one input gear and a pair of output gears defining an axis of rotation; a lock-up clutch operable to retard differentiating action, and actuating means for actuating said lock-up clutch; said lock-up clutch being operable between an engaged condition, effective to retard relative rotation between said gear case and said output gears, and a disengaged condition; said actuating means including cam means operable to effect said engaged condition of said lock-up clutch, and retarding means operable to engage said cam means and retard rotation of one member of said cam means, said retarding means comprising a flyweight mechanism rotatable about an axis oriented generally parallel to said axis of rotation, at a speed generally representative of the extent of said differentiating action, and defining a stop surface moveable from a retracted position to an extended position in response to a predetermined extent of differentiating action; said actuating means further including a latch surface disposed to engage said stop surface when said stop surface is in said extended position; characterized by:

(a) a lockout mechanism operably associated with said flyweight mechanism and including a lockout member positionable, in response to an input signal, in a normal condition and a lockout condition;

(b) in said normal condition, said lockout member permits said stop surface to move from said retracted position to said extended position; and (c) in said lockout condition, said lockout member prevents said stop surface from moving from said retracted position to said extended position.

2. A differential gear mechanism as claimed in claim 1, characterized by said flyweight mechanism including a flyweight member defining said stop surface, said flyweight member defining a pivot portion defining a pivot axis parallel to and spaced apart from said axis of said flyweight mechanism, said stop surface being generally oppositely disposed from said pivot axis.

3. A differential gear mechanism as claimed in claim 1, characterized by said lockout member being generally cylindrical, said normal condition comprising said cylindrical lockout member being disposed axially adjacent said flyweight mechanism, and said lockout condition comprising said cylindrical lockout member at least partially surrounding said flyweight mechanism.

4. A differential gear mechanism as claimed in claim 1, characterized by said lockout mechanism comprises a first annular member having an electromagnetic coil, a second annular member of known magnetic properties positioned around said first annular member and including a ramp, and a movable pin connected to said lockout member and adapted to engage said ramp when said coil is energized to move said lockout member toward said lockout condition.

5. A differential gear mechanism as claimed in claim 4, characterized by said first annular member being stationary with respect to said gear case, such that said gear case rotates relative to said first annular member.

6. A differential gear mechanism as claimed in claim 4, characterized by said second annular member being free to rotate with said gear case when said coil is de-energized and is inhibited from rotating with said gear case when said coil is energized.

7. A differential gear mechanism as claimed in claim 4, characterized by said coil being energized by said input signal.

8. A differential gear mechanism as claimed in claim 4, characterized by said pin being supported by said gear case for movement along an axis generally parallel to said axis.

9. A differential gear mechanism as claimed in claim 4, characterized by said pin being laterally offset from said flyweight mechanism and connected to said lockout member by a connecting member.

10. A differential gear mechanism as claimed in claim 4, characterized by said pin extending through and exiting said gear case adjacent said second annular member, said pin including an end portion orthogonally positioned with respect to a portion of the pin supported within said gear case, said end portion engages said ramp when said coil is energized and rotation of said second annular member is inhibited.

11. A differential gear mechanism as claimed in claim 4, characterized by said ramp including first and second ramp portions and, either of which are engageable by said pin depending on the direction of rotation of said gear case and said pin.

12. A differential gear mechanism as claimed in claim 4, characterized by said pin and said lockout member being urged toward the normal condition by a spring.

13. A differential gear mechanism as claimed in claim 1, characterized by said lockout mechanism comprises a two-piece shaft having a first shaft portion and a second shaft portion upon which said flyweight mechanism is supported for rotation therewith, a first end of first shaft portion is supported by said gear case and a second end of said first shaft portion is supported by said second shaft portion, said first shaft portion or said second shaft portion including said lockout member, which is adapted to be received in a receptacle of the other of said first shaft portion and said second shaft portion.

14. A differential gear mechanism as claimed in claim 13, characterized by said lockout member comprises a protrusion that mates with a correspondingly-shaped receptacle, whereby in the normal condition, said lockout member is received in said receptacle, locking said first and second shaft portions together for concurrent rotation and permitting said stop surface to move from said retracted position to said extended position, and in said lockout condition, said lockout member is withdrawn from said receptacle, allowing said first shaft portion to freely rotate relative to said second shaft portion and preventing said stop surface from moving from said retracted position to said extended position.

15. A differential gear mechanism as claimed in claim 13, characterized by said lockout mechanism including a compression spring disposed between said first and second shaft portions and to urge said first shaft portion away from said second shaft portion.

16. A differential gear mechanism as claimed in claim 13, characterized by said lockout mechanism further comprising an electric solenoid operably associated with said second shaft portion and supported on said gear case for rotation therewith, and a compression spring that urges the second shaft portion toward the first shaft portion, whereby when said solenoid moves said second shaft portion away from said first shaft portion and said lockout member is in said lockout condition said spring is compressed, and when said solenoid is de-energized, said spring forces said second shaft portion toward said first shaft portion, returning said lockout member to said normal condition.

* * * * *